United States Patent
Yamazaki et al.

(10) Patent No.: US 12,530,900 B2
(45) Date of Patent: Jan. 20, 2026

(54) PROCESSING APPARATUS, PROCESSING METHOD, AND NON-TRANSITORY STORAGE MEDIUM

(71) Applicant: NEC Corporation, Tokyo (JP)

(72) Inventors: Daiki Yamazaki, Tokyo (JP); Ryuji Wakakusa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 641 days.

(21) Appl. No.: 17/779,366

(22) PCT Filed: Apr. 13, 2020

(86) PCT No.: PCT/JP2020/016316
§ 371 (c)(1),
(2) Date: May 24, 2022

(87) PCT Pub. No.: WO2021/111654
PCT Pub. Date: Jun. 10, 2021

(65) Prior Publication Data
US 2022/0406069 A1    Dec. 22, 2022

(51) Int. Cl.
*G06V 20/59* (2022.01)
*G06T 7/20* (2017.01)
(Continued)

(52) U.S. Cl.
CPC ............... *G06V 20/53* (2022.01); *G06T 7/20* (2013.01); *G06V 20/593* (2022.01);
(Continued)

(58) Field of Classification Search
CPC .... G06V 20/53; G06V 20/593; G06V 40/103; G06V 2201/07; G06V 40/10;
(Continued)

(56) References Cited

U.S. PATENT DOCUMENTS

| 10,573,184 B1* | 2/2020 | Pandit | G08G 1/207 |
| 2015/0114763 A1* | 4/2015 | Kim | B66B 5/0012 |
| | | | 187/392 |

(Continued)

FOREIGN PATENT DOCUMENTS

| CN | 107464416 A | 12/2017 |
| CN | 107673152 A | 2/2018 |

(Continued)

OTHER PUBLICATIONS

International Search Report for PCT Application No. PCT/JP2020/016316, mailed on Jun. 30, 2020.

(Continued)

*Primary Examiner* — John Villecco
*Assistant Examiner* — Kyla Guan-Ping Tiao Allen
(74) *Attorney, Agent, or Firm* — Sughrue Mion, PLLC

(57) ABSTRACT

The present invention provides a processing apparatus (10) including an acquisition unit (11) that acquires a capture image capturing a movement means, an image analysis unit (12) that computes, based on the capture image, the number of persons each having an attribute satisfying a first criterion among persons inside the movement means, and the number of persons targeted for comparison, a computation unit (13) that computes a ratio of the number of persons satisfying the first criterion to the number of persons targeted for comparison, and an output unit (14) that outputs alert information when the ratio satisfies an alert condition.

12 Claims, 12 Drawing Sheets

| MOVEMENT MEANS IDENTIFICATION INFORMATION | STATE OF PRESENCE/ ABSENCE OF ALERT | ALERT DETAILS | POSITION INFORMATION | DRIVER INFORMATION |
|---|---|---|---|---|
| M3181 | PRESENCE | RATE 17% | (x1, y1) | NAME: ···<br>AGE: ···<br>NUMBER OF YEARS OF EXPERIENCE: ··· |
| M1176 | PRESENCE | RATE 9%<br>GROUP PRESENT | (x2, y2) | ··· |
| P0012 | ABSENCE | — | (x3, y3) | ··· |
| ⋮ | ⋮ | ⋮ | ⋮ | ⋮ |

(51) Int. Cl.
　　　*G06V 20/52*　　(2022.01)
　　　*G06V 40/10*　　(2022.01)
　　　*G08B 21/02*　　(2006.01)
　　　*G08B 25/00*　　(2006.01)
(52) U.S. Cl.
　　　CPC ........... *G06V 40/103* (2022.01); *G08B 25/00* (2013.01); *G06T 2207/30242* (2013.01); *G06T 2207/30268* (2013.01); *G06V 2201/07* (2022.01)
(58) Field of Classification Search
　　　CPC . G06V 20/52; G06T 7/20; G06T 2207/30242; G06T 2207/30268; G08B 21/02
　　　See application file for complete search history.

(56) References Cited

U.S. PATENT DOCUMENTS

| | | | | |
|---|---|---|---|---|
| 2018/0012463 | A1* | 1/2018 | Chaudhry | G06T 7/246 |
| 2019/0034735 | A1* | 1/2019 | Cuban | G06V 40/16 |
| 2019/0087951 | A1* | 3/2019 | Hanina | H04N 7/183 |
| 2019/0228425 | A1* | 7/2019 | Papineau | G06Q 30/0207 |
| 2019/0251367 | A1* | 8/2019 | Ida | G01C 21/3461 |
| 2019/0251818 | A1 | 8/2019 | Nagatomi et al. | |
| 2020/0250445 | A1* | 8/2020 | Papineau | G01S 5/0027 |
| 2021/0342619 | A1* | 11/2021 | Faller | G06T 7/292 |

FOREIGN PATENT DOCUMENTS

| | | | |
|---|---|---|---|
| JP | 2007-261722 | A | 10/2007 |
| JP | 2010-113494 | A | 5/2010 |
| JP | 2011-154618 | A | 8/2011 |
| JP | 2012-190072 | A | 10/2012 |
| JP | 2013-084108 | A | 5/2013 |
| JP | 2016-062414 | A | 4/2016 |
| JP | 2016-133963 | A | 7/2016 |
| JP | 2019-121039 | A | 7/2019 |
| JP | 2019-139523 | A | 8/2019 |
| WO | 2009/090724 | A1 | 7/2009 |
| WO | WO-2017104071 | A1 * | 6/2017 ............. B66B 13/14 |

OTHER PUBLICATIONS

International Search Report for PCT Application No. PCT/JP2019/046991, mailed on Dec. 24, 2019.

* cited by examiner

FIG. 4

| | |
|---|---|
| NUMBER OF PERSONS SATISFYING FIRST CRITERION | 2 |
| NUMBER OF PASSENGERS | 10 |

FIG. 5

| MOVEMENT MEANS IDENTIFICATION INFORMATION | STATE OF PRESENCE/ ABSENCE OF ALERT | ALERT DETAILS | POSITION INFORMATION | DRIVER INFORMATION |
|---|---|---|---|---|
| M3181 | PRESENCE | RATE 17% | (x1, y1) | NAME: ・・・ AGE: ・・・ NUMBER OF YEARS OF EXPERIENCE: ・・・ |
| M1176 | PRESENCE | RATE 9% GROUP PRESENT | (x2, y2) | ・・・ |
| P0012 | ABSENCE | — | (x3, y3) | ・・・ |
| ・・・ | ・・・ | ・・・ | ・・・ | ・・・ |

FIG. 6

LIST OF ALERT AND MOVEMENT MEANS

| MOVEMENT MEANS IDENTIFICATION INFORMATION | ALERT DETAILS | POSITION INFORMATION | DRIVER INFORMATION | ... |
|---|---|---|---|---|
| M3181 | RATE 17% | ○○DISTRICT | NAME: ・・・<br>AGE: ・・・<br>NUMBER OF YEARS OF EXPERIENCE: ・・・ | ... |
| M1176 | RATE 9%<br>GROUP PRESENT | ××DISTRICT | ... | ... |
| ... | ... | ... | ... | ... |

PROCESSING APPARATUS, PROCESSING METHOD, AND NON-TRANSITORY STORAGE MEDIUM

This application is a National Stage Entry of PCT/JP2020/016316 filed on Apr. 13, 2020, which claims priority from Japanese Patent Application PCT/JP2019/046991 filed on Dec. 2, 2019, the contents of all of which are incorporated herein by reference, in their entirety.

TECHNICAL FIELD

The present invention relates to a processing apparatus, a processing method, and a program.

BACKGROUND ART

Patent Document 1 discloses an elevator control apparatus that switches to a crime-prevention operation mode for preventing a woman who has got out of an elevator from being tracked by another user, when a status in the elevator satisfies a predetermined condition such as "one woman+man". In the crime-prevention operation mode, the elevator control apparatus causes each user to input a destination floor. Then, when a woman and another user arrive at the input destination floor, the elevator control apparatus controls in such a way as to first prompt, by an announcement, only the woman to get off, once close a door when confirming that the woman has got off, and thereafter again open the door in order to get the another user off.

RELATED DOCUMENT

Patent Document

[Patent Document 1] International Publication No. WO2017/104071

DISCLOSURE OF THE INVENTION

Technical Problem

A technique disclosed in Patent Document 1 is a technique for restraining a criminal act after getting out of an elevator, and does not restrain a criminal act in an elevator. The present invention has a subject of providing a technique for restraining a criminal act within a movement means such as a bus, a train, or a taxi.

Solution to Problem

The present invention provides a processing apparatus including:
  an acquisition means for acquiring a capture image capturing a movement means;
  an image analysis means for computing, based on the capture image, the number of persons each having an attribute satisfying a first criterion among persons inside the movement means, and the number of persons targeted for comparison;
  a computation means for computing a ratio of the number of persons satisfying the first criterion to the number of persons targeted for comparison; and
  an output means for outputting alert information when the ratio satisfies an alert condition.
Moreover, the present invention provides a processing method including:
by a computer,
  acquiring a capture image capturing a movement means;
  computing, based on the capture image, the number of persons each having an attribute satisfying a first criterion among persons inside the movement means, and the number of persons targeted for comparison;
  computing a ratio of the number of persons satisfying the first criterion to the number of persons targeted for comparison; and
  outputting alert information when the ratio satisfies an alert condition.
Moreover, the present invention provides a program causing a computer to function as
  an acquisition means for acquiring a capture image capturing a movement means,
  an image analysis means for computing, based on the capture image, the number of persons each having an attribute satisfying a first criterion among persons inside the movement means, and the number of persons targeted for comparison,
  a computation means for computing a ratio of the number of persons satisfying the first criterion to the number of persons targeted for comparison, and
  an output means for outputting alert information when the ratio satisfies an alert condition.

Advantageous Effects of Invention

The present invention achieves a technique for restraining a criminal act within a movement means such as a bus, a train, or a taxi.

BRIEF DESCRIPTION OF THE DRAWINGS

The above-described object, other objects, features, and advantageous effects will become more apparent from a preferred example embodiment described below and the following accompanying drawings.

FIG. 4 is a diagram schematically illustrating one example of information to be processed by the processing apparatus according to the present example embodiment.

FIG. 5 is a diagram schematically illustrating one example of information to be processed by the processing apparatus according to the present example embodiment.

FIG. 6 is a diagram schematically illustrating one example of information to be output by an external apparatus according to the present example embodiment.

DESCRIPTION OF EMBODIMENTS

First Example Embodiment

Figure 1:
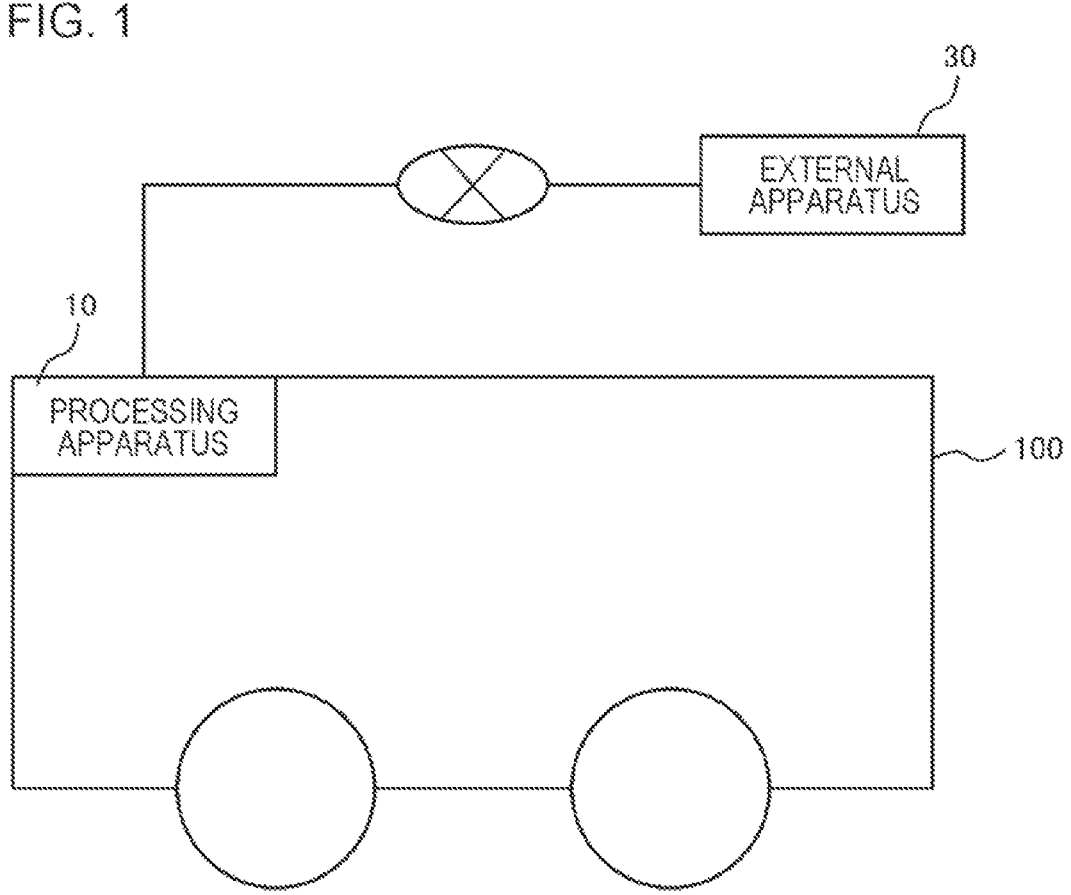
FIG. 1 is a diagram for describing an outline of a processing apparatus according to the present example embodiment.

First, an outline of a processing apparatus 10 according to the present example embodiment is described by use of FIG. 1. The processing apparatus 10 is mounted in a movement means 100. The movement means 100 has a function of accommodating and moving a person. Such a movement means 100 is exemplified by, but not limited to, for example, a bus, a train, a taxi, a ship, an airplane, or the like. While the movement means 100 is moving, a person accommodated in the movement means 100 is in a state of being confined therein, and it is difficult to escape to outside thereof. Inside such a movement means 100, there is a possibility that a criminal act more easily occurs due to a bias of an attribute of a person existing in a movement means. Particularly, a criminal act easily occurs inside the movement means 100 in which a rate of persons having an attribute that can be targets of a criminal act is low.

Thus, when acquiring a capture image capturing the movement means 100, the processing apparatus 10 computes, based on the capture image, the number of persons each having an attribute satisfying a first criterion among persons inside the movement means 100, and the number of persons targeted for comparison. A person satisfying the first criterion is a person who can become a victim of a criminal act. The number of persons targeted for comparison is the number of persons to be compared with the number of persons satisfying the first criterion, and is exemplified by, for example, the number of passengers of the movement means 100, or the number of persons (including a passenger, a driver, and the like) existing inside the movement means 100.

Then, when a ratio of the number of persons satisfying the first criterion to the number of persons targeted for comparison satisfies an alert condition, the processing apparatus 10 transmits alert information to an external apparatus 30. The external apparatus 30 can manage a status of each of the movement means 100, based on the alert information received from the processing apparatus 10. Note that, the processing apparatus 10 and the external apparatus 30 can communicate with each other via, for example, a communication network such as the Internet.

Next, a configuration of the processing apparatus 10 is described in detail. First, one example of a hardware configuration of the processing apparatus 10 is described.

Each functional unit of the processing apparatus 10 is achieved by any combination of hardware and software mainly including a central processing unit (CPU) of any computer, a memory, a program loaded onto the memory, a storage unit such as a hard disk that stores the program (that can store not only a program previously stored from a phase of shipping an apparatus but also a program downloaded from a storage medium such as a compact disc (CD) or a server or the like on the Internet), and an interface for network connection. Then, it is appreciated by a person skilled in the art that there are a variety of modified examples of a method and an apparatus for the achievement.

Figure 2:
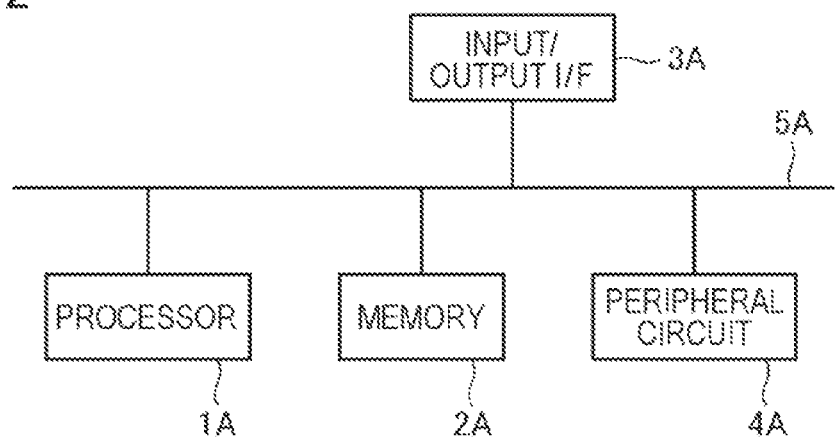
FIG. 2 is a diagram illustrating one example of a hardware configuration of the processing apparatus according to the present example embodiment.

FIG. 2 is a block diagram illustrating a hardware configuration of the processing apparatus 10. As illustrated in FIG. 2, the processing apparatus 10 includes a processor 1A, a memory 2A, an input/output interface 3A, a peripheral circuit 4A, and a bus 5A. The peripheral circuit 4A includes various modules. The processing apparatus 10 may not include the peripheral circuit 4A. Note that, the processing apparatus 10 may be configured by a plurality of physically and/or logically separated apparatuses, or may be configured by one physically and/or logically integrated apparatus. When the processing apparatus 10 is configured by a plurality of physically and/or logically separated apparatuses, each of the plurality of apparatuses may include the hardware configuration described above.

The bus 5A is a data transmission path for the processor 1A, the memory 2A, the peripheral circuit 4A, and the input/output interface 3A to mutually transmit and receive data. The processor 1A is, for example, an arithmetic processing apparatus such as a CPU and a graphics processing unit (GPU). The memory 2A is, for example, a memory such as a random access memory (RAM) and a read only memory (ROM). The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a physical button, a touch panel, and the like. The output apparatus is, for example, a display, a speaker, a printer, a mailer, and the like. The processor 1A can give an instruction to each of modules, and perform an arithmetic operation, based on an arithmetic result of each of the modules.

Figure 3:
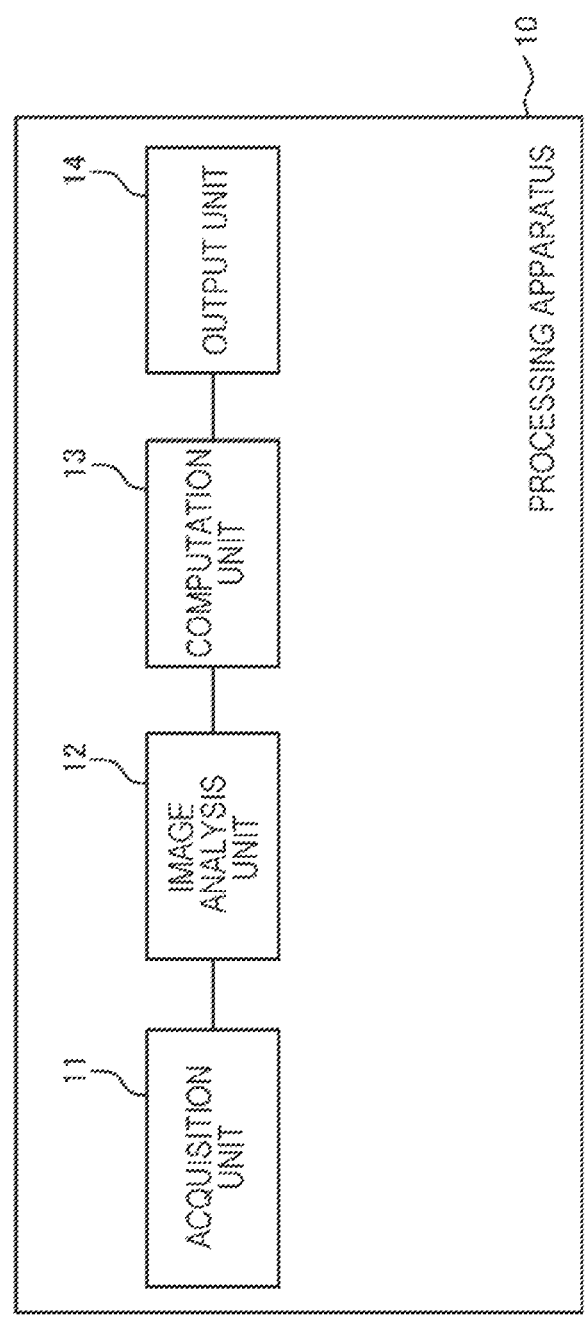
FIG. 3 is one example of a functional block diagram of the processing apparatus according to the present example embodiment.

FIG. 3 illustrates one example of a functional block diagram of the processing apparatus 10. As illustrated, the processing apparatus 10 includes an acquisition unit 11, an image analysis unit 12, a computation unit 13, and an output unit 14.

The acquisition unit 11 acquires a capture image capturing the movement means 100. The capture image may be an image capturing inside of the movement means 100, may be an image capturing a vicinity of a doorway of the movement means 100, or may be another image.

For example, a camera placed in the movement means 100 may generate such a capture image. The camera placed in the movement means 100 may constantly perform capture of a video image, or may perform capture of a still image at a predetermined timing or a video image for a certain time duration. A predetermined timing includes, but not limited to, for example, a timing when a status of a person inside the movement means 100 can change, such as a timing when a door of the movement means 100 opens, or a timing when the movement means 100 stops. A camera may receive, from, for example, an electronic control unit (ECU) mounted in the movement means 100, such a notification that the door of the movement means 100 has opened, or the movement means 100 has stopped, or may detect by another means. Otherwise, a camera (surveillance camera or the like) placed on a road or the like may generate a capture image capturing the movement means 100. The acquisition unit 11 communicates with a camera as described above by any wired and/or wireless communication means, and acquires a capture image generated by the camera.

The image analysis unit 12 computes, based on the capture image acquired by the acquisition unit 11, the number of persons each having an attribute satisfying a first criterion among persons inside the movement means 100, and the number of persons targeted for comparison.

A person satisfying the first criterion is, for example, a person who can become a victim of a criminal act. The first criterion is determined based on at least one of attributes extracted from an image, such as a gender, an age, a feature of a face, a height, a belonging, clothes, or a status. A person satisfying the first criterion may be a person who can become a victim of a crime, and is settable according to a crime status in an area. For example, in an area where a "woman" often becomes a victim of a crime, "woman" may be determined as the first criterion. Moreover, for example, in an area where a "man" often becomes a victim of a crime, "man" may be determined as the first criterion.

Moreover, another example is exemplified by a "child (e.g., an estimated age is an age equal to or less than X, or the like)", an "old person (e.g., an estimated age is an age equal to or more than Y, or the like)", a "girl (e.g., a woman of an estimated age equal to or less than X, or the like)", a "boy (e.g., a man of an estimated age equal to or less than X, or the like)", a "tourist (e.g., a person carrying a suitcase, or the like)", an "independent action (there is no person within a predetermined distance, or the like)", or the like.

The number of persons targeted for comparison is the number of persons to be compared with the number of persons satisfying the first criterion, and is, for example, the number of passengers of the movement means 100, the number of persons (including a passenger, a driver, and the like) existing inside the movement means 100, or the number of persons each having an attribute satisfying a second criterion among persons inside the movement means 100. A person satisfying the second criterion may be a person other than a person satisfying the first criterion, i.e., a person excluding a person who can become a victim of a criminal act.

Moreover, according to a crime status in an area, a person satisfying a predetermined attribute may be determined as the number of persons satisfying the second criterion. For example, a "woman" may be determined as the second criterion for an area with many crimes of a woman, a "man" may be determined as the second criterion for an area with many crimes of a man, or a person (e.g., a person of an estimated age equal to or less than Z, or the like) may be determined in an area with many crimes of a child.

Moreover, the second criterion may be a person carrying a hazardous object (e.g., carrying a long metallic bar, or the like), or a person covering a face (e.g., a person wearing a mask, or the like).

Moreover, without being limited to the above, another feature having a feature that becomes an assailant of a criminal act may be determined as the second criterion.

The second criterion is determined based on at least one of attributes extracted from an image, such as a gender, an age, a feature of a face, a height, a belonging, clothes, or a status.

Herein, one example of processing in which the image analysis unit 12 computes the number of persons satisfying the first criterion, and the number of persons targeted for comparison.

For example, when extracting a person from a capture image capturing inside of the movement means 100, the image analysis unit 12 estimates an attribute, based on a feature (a feature of a face, a height, clothes, or the like) of an appearance of each person in the image. Then, the image analysis unit 12 computes, based on an estimation result, the number of persons included in the capture image and satisfying the first criterion, and the number of persons targeted for comparison. Note that, any technique can be adopted as a means for estimating an attribute from a feature of an appearance in an image.

Note that, when the whole inside of the movement means 100 is captured with one camera, the image analysis unit 12 can compute, based on an analysis result of a capture image generated by the camera, the number of persons satisfying the first criterion inside the movement means 100, and the number of persons targeted for comparison. On the other hand, when the whole inside of the movement means 100 is captured with a plurality of cameras, the image analysis unit 12 can integrate analysis results of capture images each generated by each of the cameras, and compute the number of persons satisfying the first criterion inside the movement means 100, and the number of persons targeted for comparison. For example, the number of persons satisfying the first criterion inside the movement means 100, and the number of persons targeted for comparison can be computed by adding up the number of persons included in a capture image generated by each camera and satisfying the first criterion, and the number of persons targeted for comparison. Note that, in this case, a disadvantage of redundantly counting the same person can be restrained by determining, based on a feature of an appearance of each person, a person redundantly appearing in a plurality of capture images generated by a plurality of cameras, and subtracting an amount for the determined person from the above added value.

On the other hand, when a capture image capturing a vicinity of the doorway of the movement means 100 is processed, for example, the following processing is exemplified. First, when extracting a person from a capture image capturing a vicinity of the doorway of the movement means 100, the image analysis unit 12 can estimate an attribute, based on a feature (a feature of a face, a height, clothes, or the like) of an appearance of each person in the image. Thereby, the image analysis unit 12 can estimate an attribute of each person getting on the movement means 100, and an attribute of each person getting out of the movement means 100. Then, the image analysis unit 12 can manage, based on an estimation result, the number of persons satisfying the first criterion, and the number of persons targeted for comparison.

For example, the image analysis unit 12 manages information as illustrated in FIG. 4. The information illustrated in FIG. 4 indicates the number of persons satisfying the first criterion inside the movement means 100, and the number of passengers (one example of the number of persons targeted for comparison) at a current point. Then, the image analysis unit 12 updates the information, based on an analysis result of the above capture image. Specifically, when detecting a person getting on the movement means 100 and satisfying the first criterion, the image analysis unit 12 counts up, by one, the number of persons satisfying the first criterion and the number of passengers in the information illustrated in FIG. 4. Moreover, when detecting a person getting out of the movement means 100 and satisfying the first criterion, the image analysis unit 12 counts down, by one, the number of persons satisfying the first criterion and the number of passengers in the information illustrated in FIG. 4. Moreover, when detecting a passenger getting on the movement means 100 and other than a person satisfying the first criterion, the image analysis unit 12 counts up, by one, only the number of passengers in the information illustrated in FIG. 4. Moreover, when detecting a passenger getting out of the movement means 100 and other than a person satisfying the first criterion, the image analysis unit 12 counts down, by one, only the number of passengers in the information illustrated in FIG. 4.

Returning to FIG. 3, the computation unit 13 computes a ratio of the number of persons satisfying the first criterion to the number of persons targeted for comparison. For example, in a case of an example of FIG. 4, the computation unit 13 computes "0.2".

When a ratio computed by the computation unit 13 satisfies an alert condition, the output unit 14 outputs alert information. The alert condition is that a ratio is equal to or less than a criterion value. The criterion value is a previously determined value, and is stored in a storage apparatus of the processing apparatus 10.

Note that, a criterion value may be determined for each status, such as each time period or each area. For example, a criterion value in a time period, such as nighttime (at and after 8 p.m. or the like), when a criminal act easily occurs may be greater than a criterion value in another time period. Moreover, a criterion value when the movement means 100 exists in an area where a crime easily occurs may be greater than a criterion value when the movement means 100 exists in another area. Then, when determining whether a ratio satisfies the alert condition, the output unit 14 may acquire material information (a time, a current position of the movement means 100, or the like) for determining a status at the time, and determine, based on a criterion value being relevant to a status determined by the material information, whether the ratio satisfies the alert condition.

The output unit 14 transmits alert information to the external apparatus 30. The external apparatus 30 is at least one of an apparatus of a management center managing a plurality of the movement means 100, and an apparatus of police.

Alert information includes at least one of information identifying the movement means 100, information indicating a position of the movement means 100, the number of persons satisfying the first criterion, the number of persons targeted for comparison, and a ratio. Note that, the external apparatus 30 may be regularly notified of information indicating a position of the movement means 100 from the processing apparatus 10, in addition to alert information. A means with which the processing apparatus 10 acquires position information of the movement means 100 is exemplified by, but not limited to, a means utilizing a global positioning system (GPS) provided in the movement means 100, a means for predicting from an image including an outside scenery generated by a camera provided in the movement means 100, a means for predicting, when the above analysis is performed by acquiring a capture image generated by a camera placed on a road or the like, from a placement position of the camera, or the like.

The external apparatus 30 can manage a status of each of the movement means 100, based on various pieces of information received from each of the processing apparatuses 10 mounted in a plurality of the movement means 100. FIG. 5 schematically illustrates one example of information managed by the external apparatus 30. In the illustrated information, movement means identification information, a state of presence/absence of alert, alert details, position information, and driver information are associated with each other. Note that, another piece of information may be further associated and managed.

The movement means identification information is information for mutually identifying a plurality of the movement means 100.

The state of presence/absence of alert is information indicating whether a state is a state satisfying an alert condition.

The alert details are information indicating details (the number of persons satisfying the first criterion, the number of persons targeted for comparison, a ratio, and the like) of an alert content indicated by received alert information. Note that, although details are described in the following example embodiment, the image analysis unit 12 of the processing apparatus 10 can detect, based on a capture image, another status (groups acquainted with each other exist inside the movement means 100, a person on a blacklist exists inside the movement means 100, and the like) in which there is a possibility that a criminal act occurs. In this case, alert information output by the output unit 14 may include information indicating another detected status. In the example in FIG. 5, another detected status (a group exists) is indicated in the alert details.

The position information is information indicating a current position of each of the movement means 100. For example, the position information can be represented by latitude and longitude information or the like.

The driver information is information relating to a driver of each of the movement means 100. A database including information (a name, an age, the number of years of experience, and the like) relating to each driver is previously generated. When information indicating a driver of each of the movement means 100 is input to the external apparatus 30 by any means, the external apparatus 30 takes out, from the above database, information relating to the driver, and registers the information as information indicating a status of each of the movement means 100, as illustrated in FIG. 5.

The external apparatus 30 may include a means for outputting information as illustrated in FIG. 5 to a user via an output apparatus such as a display, a projection apparatus, a printer, a mailer, or the like. For example, the external apparatus 30 may output information indicating a status of each of a plurality of the movement means 100 as illustrated in FIG. 5.

Otherwise, as illustrated in FIG. 6, the external apparatus 30 may list and display information indicating a status of the movement means 100 being in a state satisfying an alert condition. As illustrated, the list may display the above alert details, position information, driver information, and the like. Note that, in order for a user to easily recognize, position information may be converted into a place name such as "∘∘ district" and displayed, instead of latitude and longitude information.

Moreover, the external apparatus 30 may compute a display priority degree, based on alert details, position information, driver information, or the like, and list and display in descending order of the display priority degree. For example, this is exemplified by heightening a display priority degree of the movement means 100 existing in a previously specified hazardous district, heightening a display priority degree of the movement means 100 in which a ratio of the number of persons satisfying the first criterion to the number of persons targeted for comparison is lower, heightening a display priority degree of the movement means 100 in which the number of persons satisfying the first criterion is smaller among the movement means 100 in which the number of persons satisfying the first criterion is one or more, heightening a display priority degree of the movement means 100 in which the number of years of experience of a driver is smaller, heightening a display priority degree of the movement means 100 driven by a driver on a previously generated blacklist, or heightening a display priority degree of the movement means 100 from which another status having a possibility that a criminal act occurs is detected.

Figure 7:
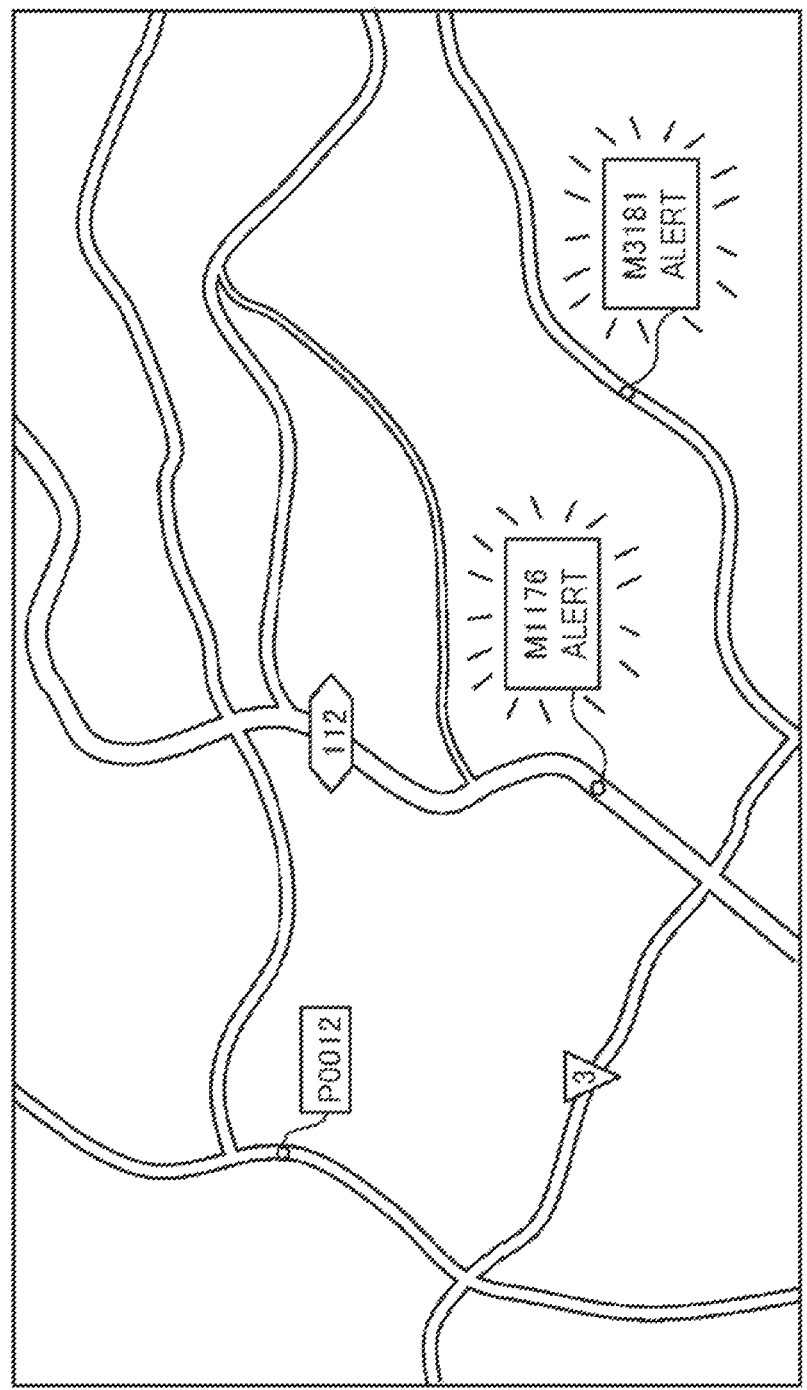
FIG. 7 is a diagram schematically illustrating one example of information to be output by the external apparatus according to the present example embodiment.

As another example, the external apparatus 30 may output, via an output apparatus, information in which a position of the movement means 100 and an alert status are mapped on a map as illustrated in FIG. 7. In the figure, a round mark displayed on the map indicates a position of each of the movement means 100. Then, information ("M1176" or the like) identifying each of the movement means 100, and a state of presence/absence of alert are indicated in association with each round mark. Then, the movement means 100 in a state satisfying an alert condition is highlighted. Note that, when accepting an input determining one movement means 100 on the screen, the external apparatus 30 may display, in a screen, alert details or driver information being relevant to the movement means 100.

Figure 8:
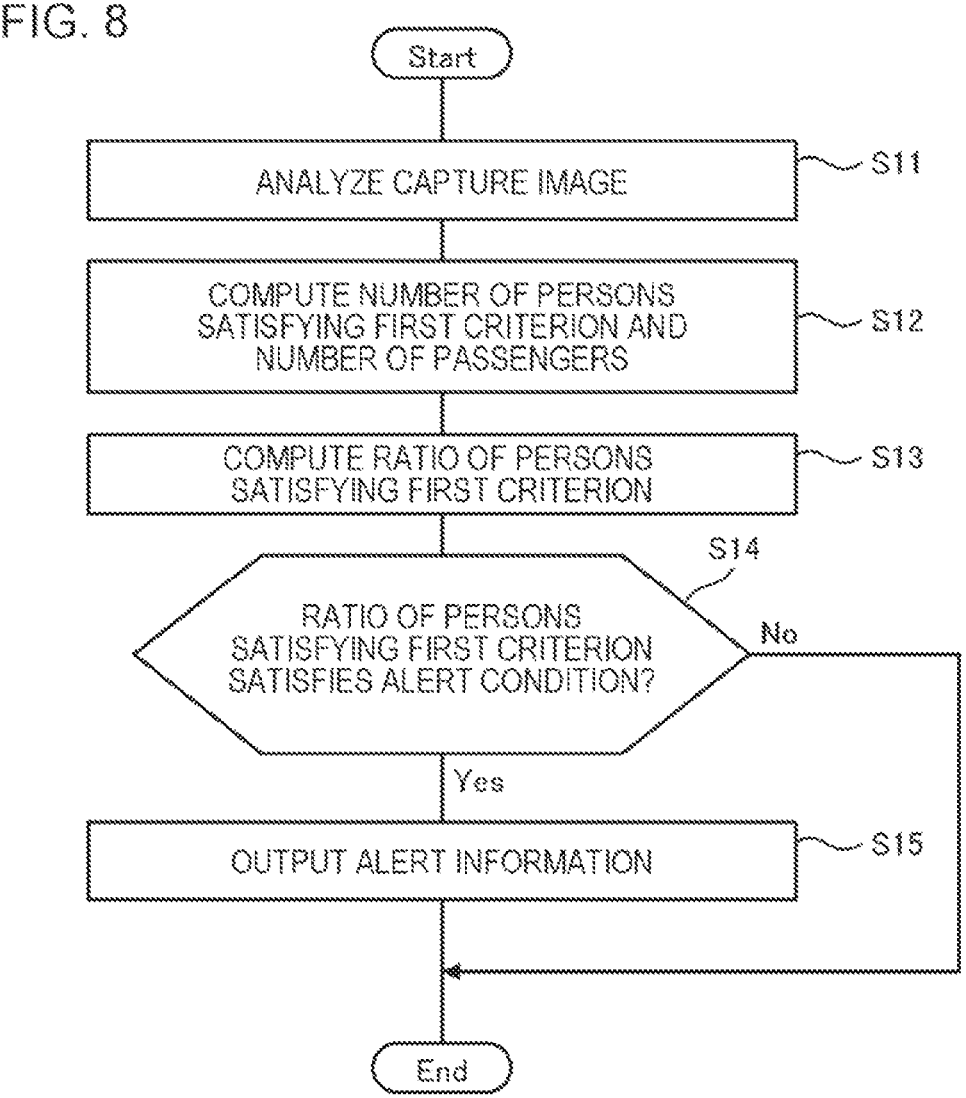
FIG. 8 is a flowchart illustrating one example of a flow of processing of the processing apparatus according to the present example embodiment.

Next, one example of a flow of processing of the processing apparatus 10 is described by use of a flowchart in FIG. 8.

When the acquisition unit 11 acquires a new capture image, the flow in FIG. 8 is executed. First, the image analysis unit 12 analyzes the newly acquired capture image, and computes the number of persons satisfying the first criterion inside the capture image, and the number of passengers (one example of the number of persons targeted for comparison) (S11). Then, the image analysis unit 12 computes, based on a computation result in S11, the number of persons satisfying the first criterion inside the movement means 100, and the number of passengers (S12).

Subsequently, the computation unit 13 computes, based on a computation result in S12, a ratio (a rate of persons satisfying the first criterion) of the number of persons satisfying the first criterion to the number of passengers (S13).

Then, when the ratio computed in S13 satisfies an alert condition (equal to or less than a criterion value) (Yes in S14), the output unit 14 transmits alert information indicating the fact to the external apparatus 30 (S15). Alert information can include at least one of information identifying the movement means 100, information indicating a position of the movement means 100, the number of persons satisfying the first criterion, the number of passengers, and the ratio computed in S13.

Note that, when the ratio computed in S13 does not satisfy an alert condition (equal to or less than a criterion value) (No in S14), processing is ended unconditionally in the flow in FIG. 8, but, as a modified example, the output unit 14 may transmit information indicating the fact to the external apparatus 30. Receiving the information enables the external apparatus 30 to recognize such a fact that the ratio of the movement means 100 has changed from a state of satisfying an alert condition to a state of not satisfying the alert condition. Then, the external apparatus 30 can update, for example, a state of presence/absence of alert in FIG. 5 from a state of presence of alert to a state of absence of alert.

The processing apparatus 10 according to the present example embodiment described above can determine, by analyzing a capture image capturing the movement means 100, whether the movement means 100 is in a status in which a criminal act can occur inside the movement means 100. Then, when determining that the movement means 100 is in a status in which a criminal act can occur, the processing apparatus 10 can transmit alert information indicating the fact to the external apparatus 30.

In this way, the movement means 100 is mounted with the processing apparatus 10 that early detects the movement means 100 being in a status in which a criminal act can occur, and notifies the external apparatus 30 of the fact, and thereby this enables police or a manager to early recognize the movement means 100 being in a status in which a criminal act can occur. Then, this enables, for the movement means 100 being in a status in which a criminal act can occur, preventing a crime, or taking some action to restrain harm expansion. As a result, a decrease is expected in the number of persons committing a criminal act within the movement means 100 in which the processing apparatus 10 is mounted and such an action is taken. In other words, mounting the processing apparatus 10 in the movement means 100 leads to crime restraint.

Moreover, the processing apparatus 10 can compute a "ratio of the number of persons satisfying the first criterion to the number of persons targeted for comparison" inside the movement means 100, and determine, based on the ratio, whether the movement means 100 is in a status in which a criminal act can occur inside the movement means 100. In this way, the processing apparatus 10 that performs the above determination, based on the above ratio, can detect, by comparatively simple processing and accurately, the movement means 100 being in a status in which a criminal act can occur.

Moreover, the processing apparatus 10 can define the first criterion, based on an attribute, and thereby perform computation of the above ratio, and detection of a status in which a criminal act can occur, using a target person having various attributes as a victim candidate.

Moreover, since the processing apparatus 10 mounted in the movement means 100 analyzes a capture image and performs detection of a status in which a criminal act can occur, an information amount communicated between an apparatus mounted in the movement means 100 and another apparatus can be reduced, as compared with a case where a server system or the like performs the pieces of processing. As a result, occurrence or the like of a communication trouble can be restrained.

Second Example Embodiment

Figure 9:
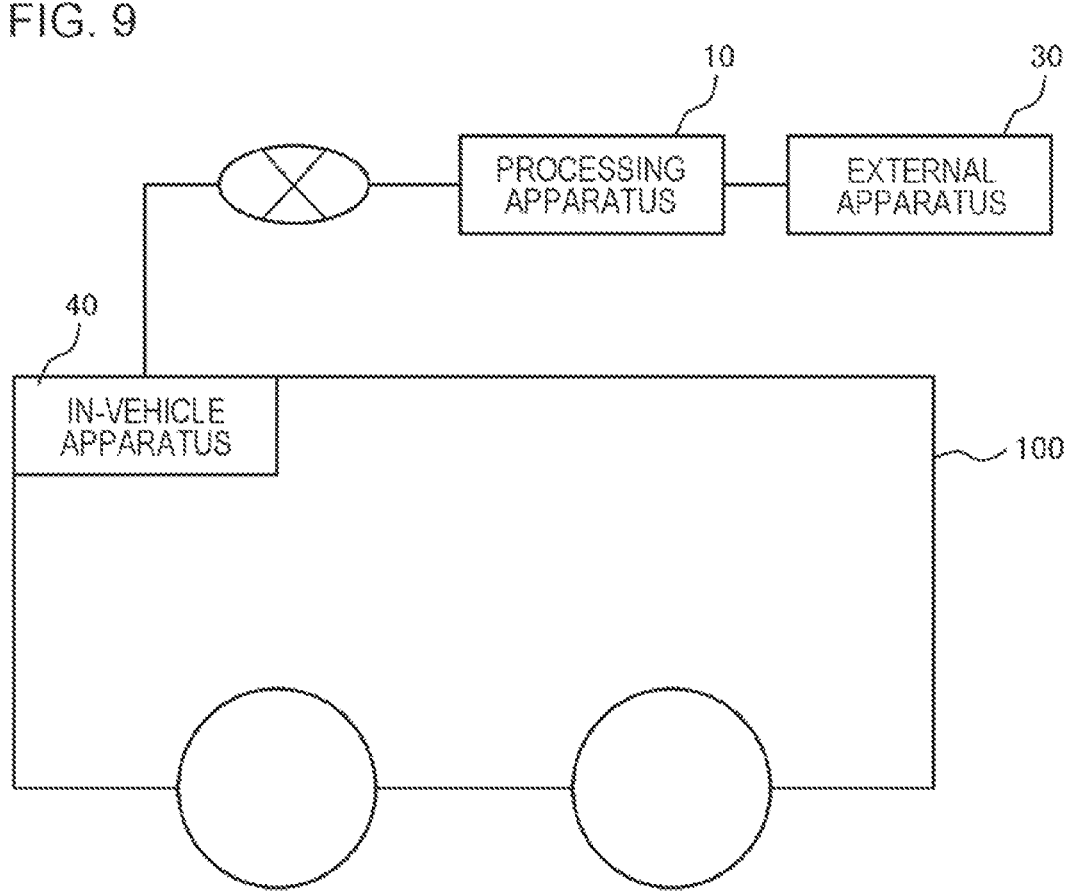
FIG. 9 is a diagram for describing an outline of the processing apparatus according to the present example embodiment.

As illustrated in FIG. 9, a processing apparatus 10 according to the present example embodiment is provided outside a movement means 100. For example, the processing apparatus 10 may be placed in a management center or the like managing a plurality of the movement means 100. In the present example embodiment, an in-vehicle apparatus 40 is mounted in the movement means 100. The in-vehicle apparatus 40 acquires a capture image capturing the movement means 100, from a camera placed in the movement means 100, or a camera (a surveillance camera or the like) placed on a road or the like, and transmits the capture image to the processing apparatus 10. Note that, the processing apparatus 10 and the in-vehicle apparatus 40 can communicate with each other via, for example, a communication network such as the Internet. The processing apparatus 10 performs processing similar to that according to the first example embodiment, based on a capture image received from the in-vehicle apparatus 40. Other components of the processing apparatus 10 are similar to those according to the first example embodiment.

The processing apparatus 10 according to the present example embodiment achieves an advantageous effect similar to that according to the first example embodiment. Moreover, since the processing apparatus 10 that performs various pieces of processing such as an image analysis is not mounted in the movement means 100 but placed in a management center or the like, a disadvantage such as theft or breakage of the processing apparatus 10 can be restrained.

Third Example Embodiment

Figure 10:
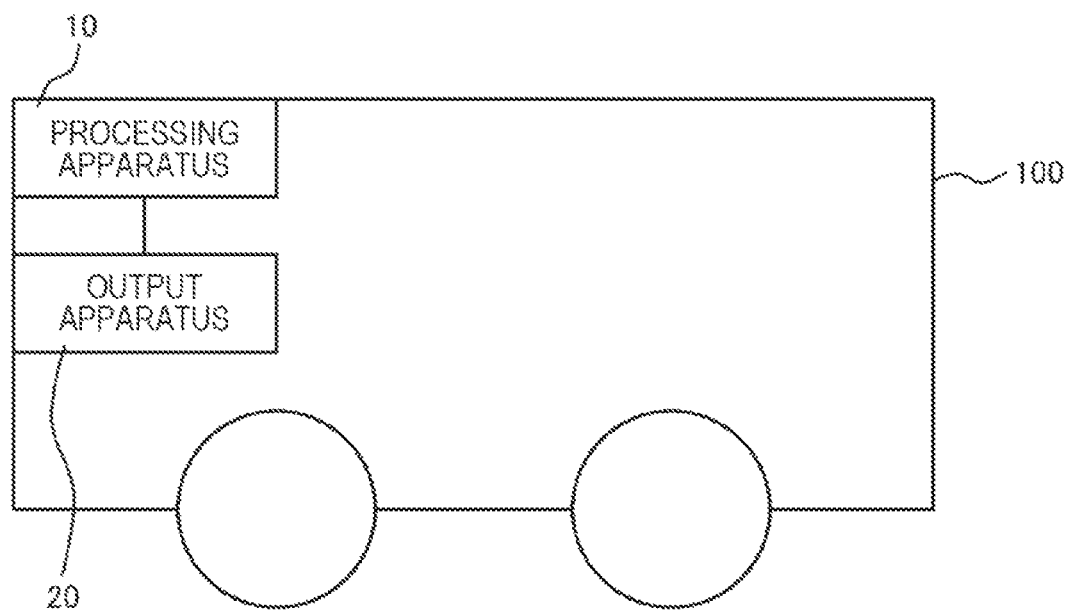
FIG. 10 is a diagram for describing an outline of the processing apparatus according to the present example embodiment.

As illustrated in FIG. 10, in the present example embodiment, an output apparatus 20 that provides information toward a person (a driver, a passenger, or the like) existing inside a movement means 100 is provided in the movement means 100. Then, when the above ratio satisfies an alert condition, an output unit 14 of a processing apparatus 10 outputs alert information to the output apparatus 20 that outputs toward a person existing inside the movement means 100.

The output apparatus 20 is, for example, a display, a projection apparatus, a speaker, an alert lamp, or the like. Otherwise, the output apparatus 20 may include a function that simultaneously transmits information to a peripheral terminal apparatus (example: a smartphone, a mobile phone, a tablet terminal, a smartwatch, a portable game machine, or the like) by near field wireless communication.

Note that, although an external apparatus 30 is not illustrated in FIG. 10, the processing apparatus 10 may be connected to the external apparatus 30, and transmit alert information toward the external apparatus 30, as in the first example embodiment. Other components of the processing apparatus 10 are similar to those according to the first example embodiment.

The processing apparatus 10 according to the present example embodiment achieves an advantageous effect similar to that according to the first example embodiment. Moreover, since the processing apparatus 10 can provide alert information toward a person existing inside the movement means 100. Thus, a person existing inside the movement means 100 can be early recognized a fact that the movement means 100 is in a status in which a criminal act can occur inside. Then, a person who can be a target of a criminal act can take such a countermeasure as to get out of the movement means 100 at a next station or stop. Moreover, such a deterrent effect is expected that a person attempting to commit a criminal act recognizes, based on the alert information, that he/she is watched over, and gives up the criminal act.

Fourth Example Embodiment

Figure 11:
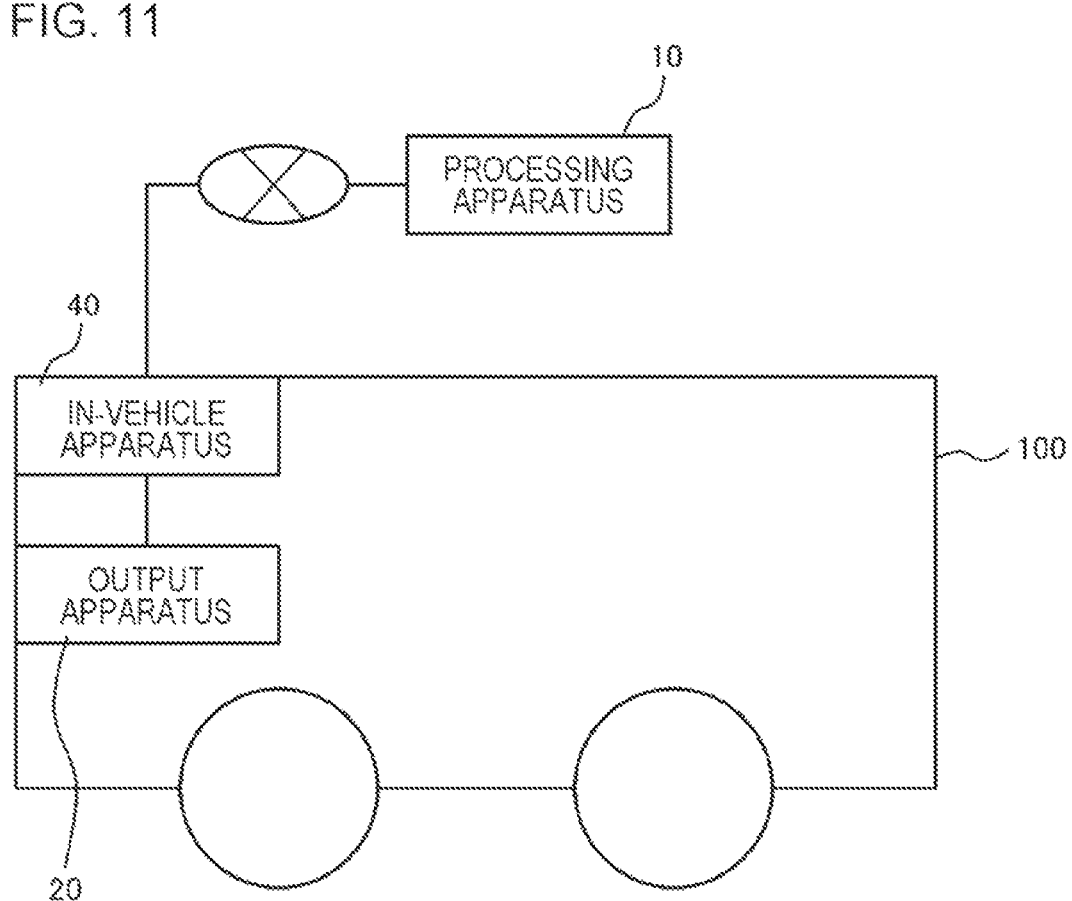
FIG. 11 is a diagram for describing an outline of the processing apparatus according to the present example embodiment.

As illustrated in FIG. 11, as in the second example embodiment, a processing apparatus 10 according to the present example embodiment is provided outside a movement means 100. Then, as in the third example embodiment, an output apparatus 20 that provides information toward a person (a driver, a passenger, or the like) existing inside the movement means 100 is provided in the movement means 100 in the present example embodiment. Note that, although an external apparatus 30 is not illustrated in FIG. 11, the processing apparatus 10 may be connected to the external apparatus 30, and transmit alert information to the external apparatus 30, as in the second example embodiment. Other components of the processing apparatus 10 are similar to those according to the second and third example embodiments.

The processing apparatus 10 according to the present example embodiment achieves an advantageous effect similar to that according to each of the second and third example embodiments.

Fifth Example Embodiment

A processing apparatus 10 according to the present example embodiment includes a function of detecting, based on a capture image acquired by an acquisition unit 11, another status in which there is a possibility that a criminal act occurs, and outputting alert information further indicating the detected another status.

An image analysis unit 12 estimates, based on a capture image acquired by the acquisition unit 11, at least one of a relation between a driver and a passenger of a movement means 100, a mutual relation of a plurality of passengers of the movement means 100, whether a person satisfying a first criterion is on the movement means 100 alone, and whether a person on a blacklist exists inside the movement means 100. Then, when an estimation result satisfies a predetermined condition, an output unit 14 outputs a fact that the estimation result satisfies the predetermined condition in such a way as to include the fact in alert information.

For example, the image analysis unit 12 estimates "whether a driver and a passenger are acquainted". Then, when it is estimated that the driver and at least one passenger are acquainted, the output unit 14 outputs the fact in such a way as to include the fact in alert information.

Moreover, for example, the image analysis unit 12 estimates "whether a plurality of persons inside the movement means 100 are acquainted with each other". Then, when it is estimated that a plurality of the persons inside the movement means 100 are acquainted with each other, the output unit 14 outputs the fact in such a way as to include the fact in alert information.

Moreover, for example, the image analysis unit 12 estimates "whether a person satisfying a first criterion is on the movement means 100 alone (whether there is not an acquaintance within the movement means 100)". Then, when it is estimated that a person satisfying a first criterion is on the movement means 100 alone (there is no acquaintance within the movement means 100), the output unit 14 outputs the fact in such a way as to include the fact in alert information.

Herein, one example of a means for estimating by an image analysis whether a plurality of persons are acquainted with each other is described, but is not a limitation. For example, the image analysis unit 12 may estimate, as persons acquainted with each other, a plurality of persons for which a state where a gaze direction, a facial direction, a mutual distance, or the like satisfies a predetermined condition (a gaze direction and/or a facial direction face toward each other, a mutual distance is equal to or less than a threshold value, or the like) continues for a predetermined time. Otherwise, the image analysis unit 12 may estimate, as persons acquainted with each other, a plurality of persons at least one of who has moved a mouth (is estimated to have talked) within the continuing time, among a plurality of persons for which a state where a gaze direction, a facial direction, a mutual distance, or the like satisfies a predetermined condition continues for a predetermined time.

Moreover, for example, the image analysis unit 12 can estimate whether a person on a blacklist exists inside the movement means 100, based on a feature of an appearance of a person extracted within a capture image, and the previously prepared blacklist of a person to be watched (including a feature of an appearance of each person). Then, when a person on a blacklist exists inside the movement means 100, the output unit 14 outputs the fact in such a way as to include the fact in alert information.

Other components of the processing apparatus 10 are similar to those according to the first to fourth example embodiments.

The processing apparatus 10 according to the present example embodiment achieves an advantageous effect similar to that according to each of the first to fourth example embodiments. Moreover, the processing apparatus 10 according to the present example embodiment can detect, by an image analysis, not only a fact that "a ratio of the number of persons satisfying the first criterion to the number of persons targeted for comparison satisfies an alert condition", but also another status in which there is a possibility that a criminal act occurs, and output alert information further indicating the detected another status. Such a processing apparatus 10 can accurately detect the movement means 100 in which there is a possibility that a criminal act occurs.

Sixth Example Embodiment

A processing apparatus 10 according to the present example embodiment includes a function of recognizing a passenger of a movement means 100, and transmitting alert information to a notification destination previously registered in association with the passenger of the movement means 100.

Recognition of a passenger may be achieved by, for example, face authentication based on a capture image acquired by an acquisition unit 11, and an image (a face image or the like) of each previously registered passenger.

Otherwise, the movement means 100 may include a reader that performs near field wireless communication, and a passenger may hold, over the reader, a portable device (an IC card, a smartphone, a smartwatch, a mobile phone, or the like) storing identification information (a name, a user identifier (ID), or the like) of the passenger, when getting on the movement means 100. Then, the processing apparatus 10 may acquire the identification information of the passenger via the reader, and recognize the passenger, based on the identification information. Moreover, the processing apparatus 10 may store, in association with identification information of each passenger acquired from the reader, a face image of each passenger extracted from an image generated by a camera that captures a vicinity of the reader. Then, the processing apparatus 10 may thereafter detect, based on a capture image, that each passenger gets out of the movement means 100, and thereby recognize that a passenger identified by each piece of identification information has got out of the movement means 100.

A notification destination is, for example, a terminal apparatus (example: a smartphone, a mobile phone, a tablet terminal, a smartwatch, a portable game machine, or the like) of a family member, a friend, or the like, and is achieved via an email, a communication application, or the like.

Other components of the processing apparatus 10 are similar to those according to the first to fifth example embodiments.

The processing apparatus 10 according to the present example embodiment achieves an advantageous effect similar to that according to each of the first to fifth example embodiments. Moreover, when detecting a status in which there is a possibility that a criminal act occurs, the processing apparatus 10 according to the present example embodiment can transmit alert information to a notification destination previously registered in association with a passenger. As a result, a person receiving the alert information can early recognize that a family member, an acquaintance, or the like is in such a hazardous status. Then, an action such as confirming a status by making a phone call can be taken.

Seventh Example Embodiment

In the present example embodiment, a processing apparatus 10 includes a function of executing processing of detecting whether a predetermined report condition is satisfied while the above ratio of a movement means 100 satisfies an alert condition, and reporting to police when satisfaction of a predetermined report condition is detected.

A predetermined report condition may be, for example, "a fact that a position of the movement means 100 has deviated from a traveling route". For example, a status can occur in which a position of the movement means 100 deviates from a traveling route due to a fact that a driver is a company with a person who commits a criminal act, or a fact that a driver is threatened by a person who commits a criminal act.

In a case of this example, while the above ratio of the movement means 100 satisfies an alert condition, the processing apparatus 10 monitors whether a position of the movement means 100 has deviated from a traveling route, based on a current position of the movement means 100, and a previously registered traveling route of the movement means 100. Then, when satisfaction of the report condition is detected, an output unit 14 transmits report information to a police system. Report information may include details of alert information, a detected report condition, and the like.

Otherwise, a predetermined report condition may be, for example, "a fact that acquisition of a capture image by an acquisition unit 11 is interrupted". For example, it can be conceived that acquisition of a capture image is interrupted due to a destruction act or the like of a camera placed in the movement means 100 by a person who commits a criminal act.

In a case of this example, it is assumed that the acquisition unit 11 of the processing apparatus 10 continues acquisition of a capture image from a camera placed in the movement means 100. Then, while the above ratio of the movement means 100 satisfies an alert condition, the processing apparatus 10 monitors whether acquisition of a capture image by the acquisition unit 11 is stopped for a predetermined time or more. Then, when detecting that the report condition is satisfied, the output unit 14 transmits report information to a police system. Report information may include details of alert information, a detected report condition, and the like.

Otherwise, a predetermined report condition may be, for example, "detection of a predetermined voice (a scream, a shout, or the like) within the movement means 100". In a case of this example, a microphone that collects a voice within the movement means 100 is placed within the movement means 100. Then, while the above ratio of the movement means 100 satisfies an alert condition, the processing apparatus 10 analyzes a voice collected by the microphone, and monitors whether a predetermined voice (a scream, a shout, or the like) is detected. Then, when detecting that the report condition is satisfied, the output unit 14 transmits report information to a police system. Report information may include details of alert information, a detected report condition, and the like. Note that, a scream, a shout, or the like can be detected from voice data by utilizing a known technique.

Note that, when satisfaction of a predetermined report condition is detected, the output unit 14 may perform the following processing instead of processing of transmitting report information to a police system according to the detection. In other words, when detecting that a predetermined report condition is satisfied, the output unit 14 may output, toward a predetermined user, an inquiry screen for inquiring whether to report to police according to the detection, and transmit report information to a police system according to a fact that an input indicating reporting from the screen is made. A predetermined user is, for example, a driver, and the output unit 14 may output the above inquiry screen via an output apparatus placed near a driver's seat. Otherwise, a predetermined user is, for example, an operator of a management center, and the output unit 14 may output the above inquiry screen via an output apparatus placed in the management center.

Moreover, instead of the processing apparatus 10, an external apparatus 30 that receives alert information from the processing apparatus 10 may perform at least one of processing of detecting whether the above report condition is satisfied, and processing of transmitting report information to a police system. In this case, a predetermined report condition may be, for example, "a fact that communication with the movement means 100 is interrupted". In other words, the processing apparatus 10 and the external apparatus 30 regularly and continuously perform communication (e.g., the processing apparatus 10 regularly transmits position information of the movement means 100 to the external apparatus 30, or the like). Then, while the above ratio of the movement means 100 satisfies an alert condition, the external apparatus 30 monitors whether communication with the processing apparatus 10 is stopped for a predetermined time or more. Then, when detecting that the report condition is satisfied, the external apparatus 30 transmits report information to a police system. Report information may include details of alert information, a detected report condition, and the like. Note that, when the report condition is satisfied, the external apparatus 30 may execute processing of analyzing images of surveillance cameras placed on a plurality of places of a road, and determining a position of the movement means 100.

Other components of the processing apparatus 10 are similar to those according to the first to sixth example embodiments.

The processing apparatus 10 according to the present example embodiment achieves an advantageous effect similar to that according to each of the first to sixth example embodiments. Moreover, while the above ratio of the movement means 100 satisfies an alert condition, the processing apparatus 10 according to the present example embodiment can monitor whether a status to be reported to police has occurred, and report to a police system when a status to be reported to police is detected. According to such a processing apparatus 10, an effect such as prevention of a criminal act or restraint of harm expansion are expected.

Eighth Example Embodiment

In the present example embodiment, a flow of processing of a processing apparatus 10 is brought into a more specific form. One example of a flow of processing of the processing apparatus 10 is described by use of a flowchart in FIG. 12.

Figure 12:
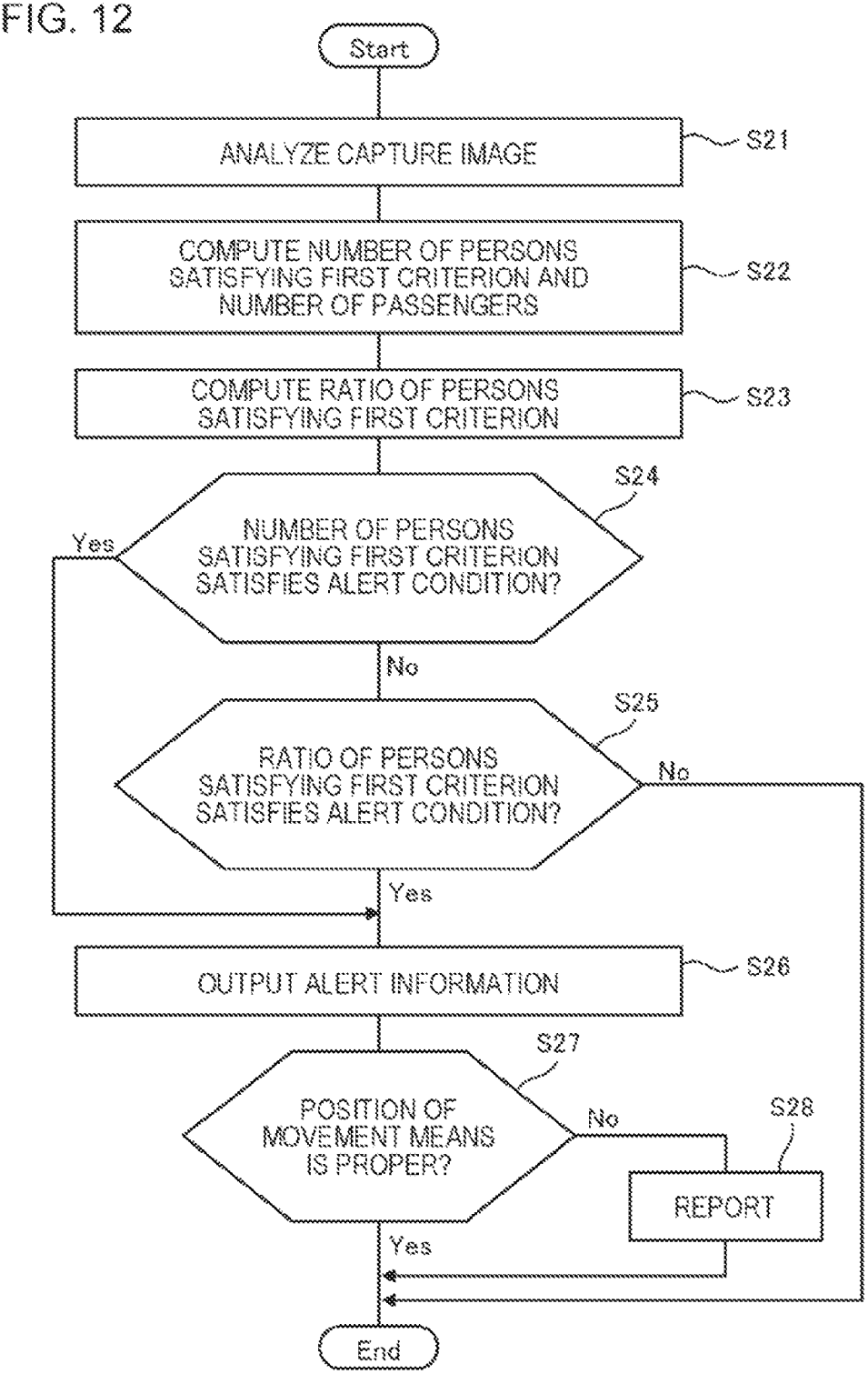
FIG. 12 is a flowchart illustrating one example of a flow of processing of the processing apparatus according to the present example embodiment.

When an acquisition unit 11 acquires a new capture image, the flow in FIG. 12 is executed. First, an image analysis unit 12 analyzes the newly acquired capture image, and computes the number of persons satisfying a first criterion inside the capture image, and the number of passengers (one example of the number of persons targeted for comparison) (S21). Then, the image analysis unit 12 computes, based on a computation result in S21, the number of persons satisfying the first criterion inside a movement means 100, and the number of passengers (S22).

Subsequently, a computation unit 13 computes, based on a computation result in S22, a ratio (a rate of persons satisfying the first criterion) of the number of persons satisfying the first criterion to the number of passengers (S23).

Then, when the number of persons satisfying the first criterion computed in S22 satisfies an alert condition (equal to or less than a criterion value) (Yes in S24), the flow advances to S26, whereas, when not satisfy (No in S24), the flow advances to S25.

In S25, whether the ratio computed in S23 satisfies an alert condition (equal to or less than a criterion value) is determined. When the ratio computed in S23 satisfies the alert condition (Yes in S25), the flow advances to S26.

In S26, an output unit 14 transmits, to an external apparatus 30, alert information indicating that the alert condition is satisfied (S26). Note that, the output unit 14 may output alert information via an output apparatus 20 provided in the movement means 100. Alert information can include at least one of information identifying the movement means 100, information indicating a position of the movement means 100, the number of persons satisfying the first criterion, the number of passengers, and the ratio computed in S23.

Thereafter, the processing apparatus 10 monitors whether a position of the movement means 100 has deviated from a traveling route, based on a current position of the movement means 100, and a previously registered traveling route of the movement means 100 (S27). Then, when deviation of a position of the movement means 100 from the traveling route is detected (No in S27), the output unit 14 transmits report information to a police system (S28). Report information may include details of alert information, information indicating deviation of a position of the movement means 100 from a traveling route, and the like.

Other components of the processing apparatus 10 are similar to those according to the first to seventh example embodiments. The processing apparatus 10 according to the present example embodiment achieves an advantageous effect similar to that according to each of the first to seventh example embodiments.

While the invention of the present application has been described above with reference to the example embodiment (and example), the invention of the present application is not limited to the example embodiment (and example) described above. Various alterations that a person skilled in the art is able to understand can be made to a configuration and details of the invention of the present application, within the scope of the invention of the present application.

What is claimed is:

1. A processing apparatus comprising:
   at least one memory configured to store one or more instructions; and
   at least one processor configured to execute the one or more instructions to:
   acquire a capture image capturing a movement means;
   compute, based on the capture image, a number of persons each having an attribute satisfying a first criterion among persons inside the movement means, and a number of persons targeted for comparison;
   compute a ratio of the number of persons satisfying the first criterion to the number of persons targeted for comparison;
   output a first alert information in a case where the ratio is equal to or less than a criterion value, the alert information including information indicating details of an alert content in the movement means, and driver information relating to a driver of the movement means;
  detect whether a predetermined report condition is satisfied while the ratio is equal to or less than a criterion value, and output a second alert information when satisfaction of the predetermined report condition is detected, the predetermined report condition including a fact that a position of the movement means has deviated from a traveling route, or a fact that acquisition of the capture image is interrupted; and
  decide the criterion value based on a time or a current position of the movement means.

2. The processing apparatus according to claim 1, wherein the first criterion is determined based on a feature of an appearance of a person inside the movement means.

3. The processing apparatus according to claim 1, wherein the number of persons targeted for comparison is a number of passengers of the movement means, a number of persons existing inside the movement means, or a number of persons each having an attribute satisfying a second criterion among persons inside the movement means, and
the second criterion is determined based on a feature of an appearance of a person inside the movement means.

4. The processing apparatus according to claim 1, wherein,
  the processor is further configured to execute the one or more instructions to output a third alert information when the number of persons satisfying the first criterion satisfies an alert condition.

5. The processing apparatus according to claim 1, wherein the processor is further configured to execute the one or more instructions to transmit the first alert information and the second alert information to an external apparatus being at least one of an apparatus of a management center managing the movement means, and an apparatus of police.

6. The processing apparatus according to claim 1, wherein the processor is further configured to execute the one or more instructions to output the first alert information and the second alert information to an output apparatus that provides information toward a person existing inside the movement means.

7. The processing apparatus according to claim 1, wherein the first alert information and the second alert information includes at least one of information identifying the movement means, information indicating a position of the movement means, the number of persons satisfying the first criterion, the number of persons targeted for comparison, and the ratio.

8. The processing apparatus according to claim 1, wherein the processor is further configured to execute the one or more instructions to:
  estimate, based on the capture image, at least one of a relation between a driver and a passenger of the movement means, a mutual relation of a plurality of passengers of the movement means, whether a person satisfying the first criterion is on the movement means alone, and whether a person on a blacklist exists inside the movement means, and,
  when the estimation result satisfies a predetermined condition, include, in the first alert information and the second alert information, a fact that the estimation result satisfies the predetermined condition.

9. The processing apparatus according to claim 1, wherein the movement means is a bus, a train, a taxi, a ship, or an airplane.

10. The processing apparatus according to claim 1, wherein the processor is further configured to execute the one or more instructions to:
  monitor whether the predetermined report condition is satisfied while the ratio satisfies the alert condition, and
  report when satisfaction of the predetermined report condition is detected.

11. A processing method comprising:
  by a computer,
  acquiring a capture image capturing a movement means;
  computing, based on the capture image, a number of persons each having an attribute satisfying a first criterion among persons inside the movement means, and a number of persons targeted for comparison;
  computing a ratio of the number of persons satisfying the first criterion to the number of persons targeted for comparison;
  outputting a first alert information in a case where the ratio is equal to or less than a criterion value, the alert information including information indicating details of an alert content in the movement means, and driver information relating to a driver of the movement means;
  detecting whether a predetermined report condition is satisfied while the ratio is equal to or less than a criterion value, and outputting a second alert information when satisfaction of the predetermined report condition is detected, the predetermined report condition including a fact that a position of the movement means has deviated from a traveling route, or a fact that acquisition of the capture image is interrupted; and
  deciding the criterion value based on a time or a current position of the movement means.

12. A non-transitory storage medium storing a program causing a computer to:
  acquire a capture image capturing a movement means,
  compute, based on the capture image, a number of persons each having an attribute satisfying a first criterion among persons inside the movement means, and a number of persons targeted for comparison,
  compute a ratio of the number of persons satisfying the first criterion to the number of persons targeted for comparison,
  output a first alert information in a case where the ratio is equal to or less than a criterion value, the alert information including information indicating details of an alert content in the movement means, and driver information relating to a driver of the movement means,
  detect whether a predetermined report condition is satisfied while the ratio is equal to or less than a criterion value, and output a second alert information when satisfaction of the predetermined report condition is detected, the predetermined report condition including a fact that a position of the movement means has deviated from a traveling route, or a fact that acquisition of the capture image is interrupted, and
  decide the criterion value based on a time or a current position of the movement means.

* * * * *